(12) United States Patent
Lo et al.

(10) Patent No.: US 10,520,019 B2
(45) Date of Patent: Dec. 31, 2019

(54) SLIDE MODULE

(71) Applicant: SYNCMOLD ENTERPRISE CORP., New Taipei (TW)

(72) Inventors: Wen-Hung Lo, New Taipei (TW); Kuang-Yao Wu, New Taipei (TW); Ching-Hui Yen, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 15/950,579

(22) Filed: Apr. 11, 2018

(65) Prior Publication Data

US 2018/0372153 A1 Dec. 27, 2018

Related U.S. Application Data

(60) Provisional application No. 62/518,793, filed on Jun. 13, 2017.

(30) Foreign Application Priority Data

Jan. 12, 2018 (TW) .............................. 107200562 U

(51) Int. Cl.
*F16C 29/04* (2006.01)
*F16C 29/06* (2006.01)
(Continued)

(52) U.S. Cl.
CPC .......... *F16C 29/045* (2013.01); *F16C 29/005* (2013.01); *F16C 29/048* (2013.01);
(Continued)

(58) Field of Classification Search
CPC .... F16C 29/005; F16C 29/045; F16C 29/048; F16C 29/0633; F16C 2300/02; F16M 11/043; A47B 2210/0032; A47B 2210/035
(Continued)

(56) References Cited

U.S. PATENT DOCUMENTS

| 5,757,109 A | * | 5/1998 | Parvin ................. | A47B 88/493 312/334.11 |
| 6,454,372 B1 | * | 9/2002 | Yang .................... | A47B 88/493 312/334.13 |

(Continued)

FOREIGN PATENT DOCUMENTS

| CN | 107131209 A | * | 9/2017 | ............. F16C 29/048 |
| CN | 107202226 A | * | 9/2017 | ............ F16M 11/046 |

(Continued)

*Primary Examiner* — Marcus Charles
(74) *Attorney, Agent, or Firm* — Muncy, Geissler, Olds & Lowe, P.C.

(57) ABSTRACT

A slide module comprises an outer rail, a ball rail, first balls and second balls. The outer rail has a first inner surface and a second inner surface. The ball rail has a first holding section and a second holding section. The first balls are rollably disposed in a plurality of first holes of the first holding section in which the first ball is contacted with the first inner surface and the second holding section and distant from the second inner surface. The second balls are rollably disposed in a plurality of second holes of the second holding section in which the second ball is contacted with the second inner surface and the first holding section and distant from the inner surface. Thereby, the ball rail is capable of moving along the axial direction with respect to the outer rail through the first balls and the second balls.

13 Claims, 3 Drawing Sheets

(51) Int. Cl.
  *F16M 11/04* (2006.01)
  *F16C 29/00* (2006.01)
(52) U.S. Cl.
  CPC .... *F16M 11/043* (2013.01); *A47B 2210/0032* (2013.01); *A47B 2210/0035* (2013.01); *F16C 29/0633* (2013.01); *F16C 2300/02* (2013.01)
(58) Field of Classification Search
  USPC ............... 384/7, 18, 49; 312/334.11, 334.17, 312/334.25, 334.38, 334.44
  See application file for complete search history.

(56) References Cited

U.S. PATENT DOCUMENTS

| 7,866,771 | B2 * | 1/2011 | Daino | .................... | A47B 88/49 |
| | | | | | 312/334.16 |
| 9,291,199 | B2 * | 3/2016 | Foster | .................. | A47B 88/493 |

FOREIGN PATENT DOCUMENTS

| DE | 202014105949 U1 * | 2/2015 | ............ F16C 29/048 |
| EP | 1014004 A2 * | 6/2000 | ............ F16C 33/425 |
| TW | M523808 U | 6/2016 | |

\* cited by examiner

SLIDE MODULE

CROSS REFERENCE TO RELATED APPLICATION

This application claims the benefit of U.S. Provisional Application Ser. No. 62/518,793 filed on Jun. 13, 2017, and the benefit of Taiwan Patent Application Serial No. 107200562 filed on Jan. 12, 2018. The entirety of each the Application is incorporated herein by reference.

BACKGROUND OF THE INVENTION

1. Field of the Invention

The present invention relates to a slide module. More particularly, the present invention relates to a ball slide module.

2. Description of Related Art

The related art of Taiwan Patent No. M523808 disclosed a conventional slide module comprising an outer rail, an inner rail and a ball set and a connecting board. The ball set has a middle rail and a plurality of balls rollably embedded in the middle rail. The outer rail has an opening for receiving the ball set and the inner rail, therefore, the balls are located between the outer rail and the inner rail. The connecting board further fixes on the inner rail. The inner rail and the connecting board are adapted to move with respect to the outer rail through the balls. No matter how the above mentioned conventional slide module disclosed in TW Patent No. M523808 being improved, the ball set is inevitably disposed between a connecting board and the outer rail (the conventional inner rail has been omitted). Moreover, the balls are arranged into two columns to clamp the connecting board. Hence, the conventional slide module is bulky in view of the total thickness of the two columns of the balls, the connecting board and the outer rail.

Accordingly, the invention provides a slimmer slide module.

SUMMARY OF THE INVENTION

The object of the present invention is to provide a slide module to omit the inner rail of the conventional slide module. The balls of the present invention are disposed in the ball rail and against two inner surfaces of the outer rail to be arranged in one column. Therefore, the slide module is able to be slim.

To achieve the object, the slide module of the present invention comprises an outer rail, a ball rail, a plurality of first balls and a plurality of the second balls. The outer rail extends along an axial direction and has a first inner surface and a second inner surface corresponding to the first inner surface. The ball rail includes a first board and a second board corresponding to the first board. The first board has a first holding section and a first joint section. The second board has a second holding section and a second joint section. The first holding section and the second holding section are located in the outer rail. The first joint section and the second joint section extend out from the outer rail. A plurality of first holes are formed on the first holding section and spacing apart from one another, and a plurality of second holes are formed on the second holding section and spacing apart from one another. The first balls are rollably disposed in the first holes respectively, and each of the first balls is held between the first inner surface and the second holding section and distant from the second inner surface. The second balls are rollably disposed in the second holes respectively, and each of the second balls is held between the second inner surface and the first holding section and distant from the first inner surface. Thereby, the ball rail is capable of moving along the axial direction with respect to the outer rail through the first balls and the second balls.

A plurality of first abutting areas are formed on the second holding section in manner of spacing apart from one another. A plurality of second abutting areas are formed on the first holding section in manner of spacing apart from one another. The first holes are corresponding to the first abutting areas and the second holes are corresponding to the second abutting areas. Thereby, the first balls are rollably disposed in the first holes and the first abutting areas respectively, and the second balls are rollably disposed in the second holes and the second abutting areas respectively In one embodiment, each of the first abutting areas includes a first aperture having a diameter smaller than a diameter of the first hole, and each of the second abutting areas includes a second aperture having a diameter smaller than a diameter of the second hole.

In another embodiment, each of the first abutting areas and the second abutting areas has a first arc surface for contacting with the first ball or the second ball, respectively.

The outer rail has a cross-section perpendicular to the axial direction with a U-shaped configuration. Along the cross-section, the outer rail has a first opening facing toward a first direction. The first holding section and the second holding section are able to be combined and to have a cross-section perpendicular to the axial direction with a U-shaped configuration. Along the cross-section of the first holding section and the second holding section, a second opening faces toward a second direction. The first holding section and the second holding section are located in the outer rail and the first direction and the second direction are opposite to each other so that the outer rail is able to cover the second opening.

Each of the first inner surfaces and the second inner surfaces has a second arc surface for correspondingly contacting with the first ball or the second ball. The outer rail further has two stoppers being disposed at two ends of the outer rail respectively. The first joint section and the second joint section further comprises a plurality of securing holes being formed thereon and spacing apart from one another.

In a preferred embodiment, the first holding section, the second holding section, the first joint section and the second joint section are formed integrally.

In another embodiment, the first holding section and the first joint section are formed integrally, the second holding section and the second joint section are formed integrally, and the first joint section and the second joint section are overlapped to each other.

The first holding section and the second holding section are disposed in the outer rail and spacing apart from each other and the first joint section and the second joint section are connected to each other so that a cross-section of the ball rail being perpendicular to the axial direction has a Y-shaped configuration.

The first ball is defined with a central axis extending along the axial direction and passing through the adjacent second ball, and the second ball is defined with a central axis extending along the axial direction and passing through the adjacent first ball, in which the central axis of the first ball and the central axis of the second ball are interlaced.

The first ball and the second ball are defined with having projections being partially overlapped to each other on a projection surface which is perpendicular to the axial direction.

The detailed technology and preferred embodiments implemented for the subject invention are described in the following paragraphs accompanying the appended drawings for people skilled in this field to well appreciate the features of the claimed invention.

DETAILED DESCRIPTION OF THE PREFERRED EMBODIMENT

Figure 1:
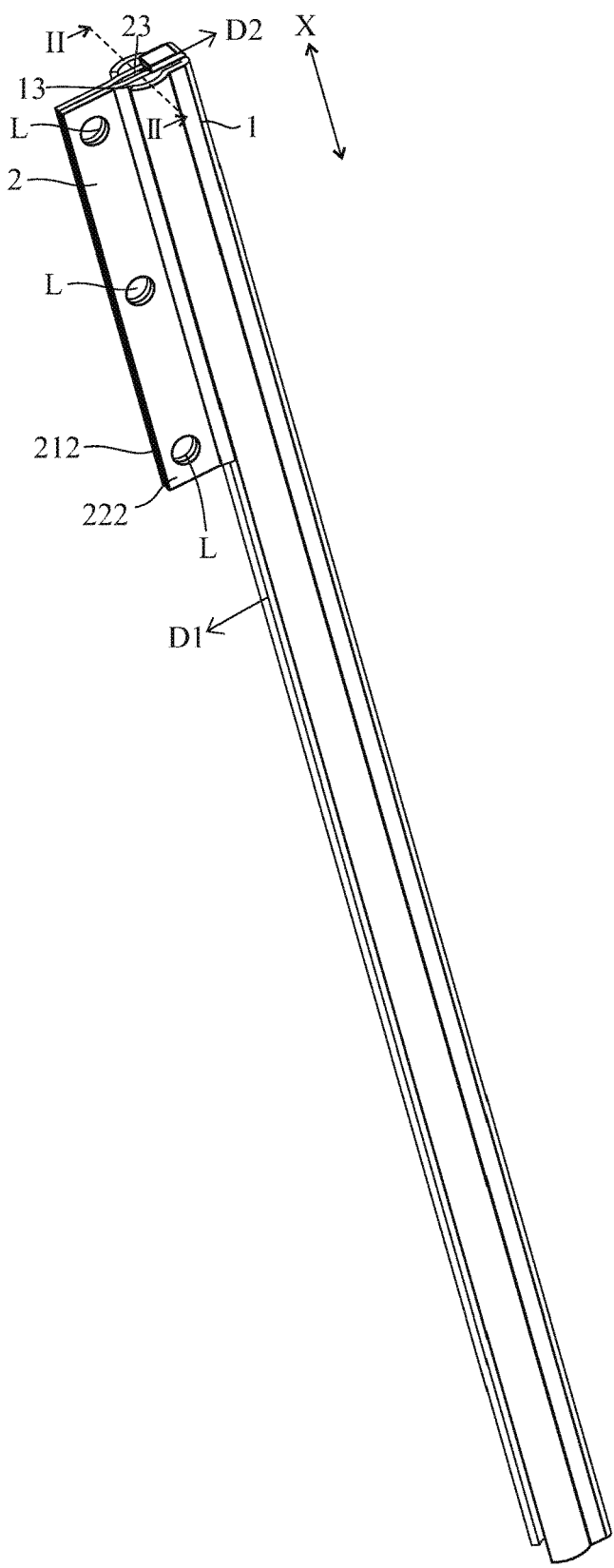
FIG. 1 is a perspective view of the slide module of the present invention.
Figure 2:
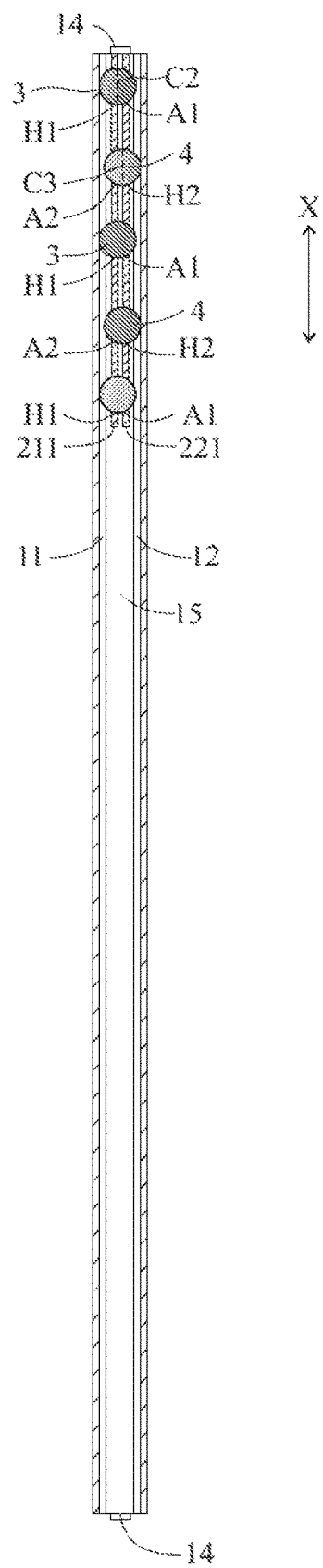
FIG. 2 is a cross-sectional view along the II-II cross-sectional line in FIG. 1.
Figure 3:
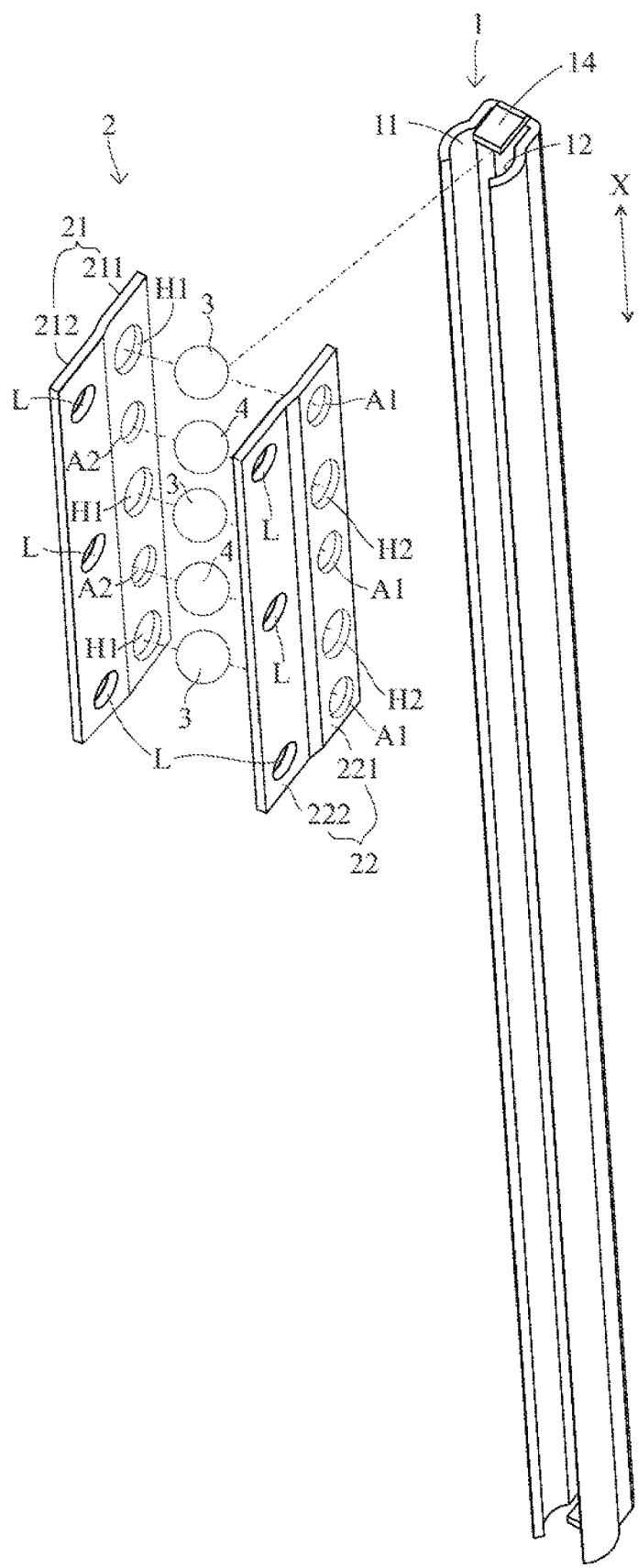
FIG. 3 is an explosive view of the slide module of the present invention.

Please refer to FIG. 1, FIG. 2 and FIG. 3, a slide module 1000 of the present invention comprises an outer rail 1, a ball rail 2, three first balls 3 and two second balls 4. The detailed structure of each element and the relationship between the elements are further described herein below.

The outer rail 1 extends along an axial direction X and has a first inner surface 11, a second inner surface 12 corresponding to the first inner surface 11, a first opening 13, two stoppers 14 and a receiving space 15. The stoppers 14 are located at two ends of the receiving space 15 respectively.

The ball rail 2 has a first board 21, a second board 22 corresponding to the first board 21, and a second opening 23. The first board 21 has a first holding section 211 and a first joint section 212, and the second board 22 has a second holding section 221 and the second joint section 222. The first holding section 211 and the second holding section 221 are disposed in the receiving space 15 through the first opening 13 and are able to move along the axial direction X. The first holding section 211 and the second holding section 221 are spaced apart from each other. The outer rail 1 has a cross-section perpendicular to the axial direction X with a U-shaped configuration. From the perspective of the cross-section of the outer rail 1, the first opening 13 of the outer rail 1 faces toward a first direction D1. The first holding section 211 and the second holding section 221 are connected and collaboratively configured a U-shaped cross-section perpendicular to the axial direction X. A second opening 23 of the cross-section collaboratively configured by the first holding section 211 and the second holding section 221 faces toward a second direction D2. The first direction D1 and the second direction D2 are corresponding and the outer rail 1 is able to cover the second opening 23. The first joint section 212 and the second joint section 222 extend out of the outer rail 1 from the first opening 13. In the present embodiment, the first holding section 211 and the first joint section 212 are formed integrally, and the second holding section 221 and the second joint section 222 are formed integrally. The first joint section 212 and the second joint section 222 are connected to each other so that a cross-section of the ball rail 2 has a Y-shaped configuration perpendicular to the axial direction X. Each of the first joint section 212 and the second joint section 222 has a plurality of securing holes L being separately formed thereon so that the present invention is able to connect to other elements (such as a slider). It should be noted that the first holding section 211, the second holding section 221, the first joint section 212 and the second joint section 222 are able to be formed integrally in another embodiment.

A plurality of first holes H1 and a plurality of second abutting areas A2 are formed on the first holding section 211, and the first holes H1 and the second abutting areas A2 are interlaced and spacing apart. Similarly, a plurality of second holes H2 and a plurality of first abutting areas A1 are formed on the second holding section 221, and the second holes H2 and the first abutting areas A1 are interlaced and spacing apart. Meanwhile, the first hole H1 and the first abutting area A1 are corresponding to each other, and the second hole H2 and the second abutting area A2 are corresponding to each other. In the present embodiment, as shown in FIG. 3, each of the first abutting areas A1 and each of the second abutting areas A2 have a first aperture and a second aperture respectively, wherein a diameter of the first aperture of the first abutting area A1 is smaller than a diameter of the first hole H1, and a diameter of the second aperture of the second abutting area A2 is smaller than a diameter of the second hole H2.

When each of the first balls 3 is rollably disposed at the corresponding first hole H1 and the corresponding first abutting area A1 (the first ball 3 is partially against the aperture wall of the first aperture), the first ball 3 contacts with the first inner surface 11 of the outer rail 1 and is distant from the second inner surface 12 (that is, the first ball 3 does not contact with the second inner surface 12). When each of the second balls 4 is rollably disposed at the corresponding second hole H2 and the corresponding second abutting area A2 (the second ball 4 is partially against the aperture wall of the second aperture), the second ball 4 contacts with the second inner surface 12 of the outer rail 1 and is distant from the first inner surface 11 (that is, the second ball 4 does not contact with the first inner surface 11). As shown in FIG. 2, a central axis C2 of the first ball 3 (extending along the axial direction X) and a central axis C3 of the second ball 4 (extending along the axial direction X) are not on the same line. However, the central axis C2 of the first ball 3 passes through the second ball 4, and the central axis C3 of the second ball 4 passes through the first ball 3. That is to say, projections defined by the first ball 3 and the second ball 4 are partially overlapped to each other on a projection surface which is perpendicular to the axial direction X. Thereby, the ball rail 2 is used for receiving the balls in the present invention and thus when a force is applied to the ball rail 2, the ball rail 2 is able to move along the axial direction X with respect to the outer rail 1 through the first balls 3 and the second balls 4.

Unlike the conventional slide module has two columns of balls, in the present invention, the balls are arranged in one column and are partially interlaced and projectedly overlapped to one another so that the slide module of the present invention is able to be slim.

In other embodiment of the present invention, each of the first abutting areas A1 and the second abutting areas A2 has a first arc surface instead of an aperture to contact with each of the first balls 3 and the second balls 4. Each of the first inner surface 11 and the second inner surface 12 has a second arc surface extending along the axial direction X to contact with the first balls 3 and the second balls 4.

In conclusion, in the present invention, the structure of the ball rail has been improved. The balls are disposed at the ball rail so that the conventional inner rail can be omitted. Thus, the present invention provides a slimmer slide module.

Although the present invention has been explained in relation to its preferred embodiment, it is to be understood that many other possible modifications and variations can be made without departing from the spirit and scope of the invention as hereinafter claimed.

What is claimed is:

1. A slide module, comprising:
an outer rail, extending along an axial direction and having a first inner surface and a second inner surface corresponding to the first inner surface;
a ball rail, including a first board and a second board corresponding to the first board, the first board having a first holding section and a first joint section, the second board having a second holding section and a second joint section, the first holding section and the second holding section being located in the outer rail, the first joint section and the second joint section extending out from the outer rail, wherein a plurality of first holes are formed on the first holding section and spacing apart from one another, and a plurality of second holes are formed on the second holding section and spacing apart from one another;
a plurality of first balls, being rollably disposed in the first holes respectively, and each of the first balls being held between the first inner surface and the second holding section and distant from the second inner surface; and
a plurality of second balls, being rollably disposed in the second holes respectively, and each of the second balls being held between the second inner surface and the first holding section and distant from the first inner surface;
whereby the ball rail is capable of moving along the axial direction with respect to the outer rail through the first balls and the second balls.

2. The slide module as claimed in claim 1, wherein a plurality of first abutting areas are separately formed on the second holding section, a plurality of second abutting areas are separately formed on the first holding section, the first holes are corresponding to the first abutting areas and the second holes are corresponding to the second abutting areas, whereby each of the first balls is rollably disposed between the first holes and the first abutting areas respectively, and each of the second balls is rollably disposed between the second holes and the second abutting areas respectively.

3. The slide module as claimed in claim 2, wherein each of the first abutting areas includes a first aperture having a diameter smaller than a diameter of the first hole, and each of the second abutting areas includes a second aperture having a diameter smaller than a diameter of the second hole.

4. The slide module as claimed in claim 2, wherein each of the first abutting areas and the second abutting areas has a first arc surface for contacting with the first balls and the second balls respectively.

5. The slide module as claimed in claim 2, wherein the first holding section, the second holding section, the first joint section and the second joint section are formed integrally.

6. The slide module as claimed in claim 2, wherein the first holding section and the first joint section are formed integrally, the second holding section and the second joint section are formed integrally, and the first joint section and the second joint section are connected to each other.

7. The slide module as claimed in claim 2, wherein the first holding section and the second holding section are disposed in the outer rail and spacing apart from each other, and the first joint section and the second joint section are connected to each other so that a cross-section of the ball rail being perpendicular to the axial direction has a Y-shaped configuration.

8. The slide module as claimed in claim 1, wherein the outer rail has a cross-section perpendicular to the axial direction with a U-shaped configuration, and the outer rail has a first opening facing toward a first direction from the perspective of the cross-section of the outer rail, wherein the first holding section and the second holding section collaboratively configured a U-shaped cross-section perpendicular to the axial direction and a second opening facing toward a second direction from the perspective of the cross-section of the first holding section and the second holding section, wherein the first holding section and the second holding section are located in the outer rail wherein the first direction and the second direction are opposite and the outer rail covers the second opening.

9. The slide module as claimed in claim 8, wherein each of the first inner surfaces and the second inner surfaces has a second arc surface for contacting with the first balls and the second balls respectively.

10. The slide module as claimed in claim 9, wherein the outer rail further has two stoppers being disposed at two ends of the outer rail respectively.

11. The slide module as claimed in claim 10, wherein the first joint section and the second joint section further comprise a plurality of securing holes being formed thereon and spacing apart from one another.

12. The slide module as claimed in claim 1, wherein the first ball is defined with a central axis extending along the axial direction and passing through the second ball, and the second ball is defined with a central axis extending along the axial direction and passing through the first ball, in which the central axis of the first ball and the central axis of the second ball are interlaced.

13. The slide module as claimed in claim 12, wherein projections defined by the first ball and the second ball are partially overlapped to each other on a projection surface which is perpendicular to the axial direction.

* * * * *